(12) United States Patent
Anschutz et al.

(10) Patent No.: US 9,771,513 B2
(45) Date of Patent: Sep. 26, 2017

(54) PROPPANTS AND ANTI-FLOWBACK ADDITIVES INCLUDING KAOLIN CLAY

(71) Applicant: IMERYS OILFIELD MINERALS, INC., Roswell, GA (US)

(72) Inventors: Donald Allen Anschutz, Huffman, TX (US); Michael Burgess, Milledgeville, GA (US); Robert J. Pruett, Milledgeville, GA (US)

(73) Assignee: IMERYS OILFIELDS MINERALS, INC., Roswell, GA (US)

( * ) Notice: Subject to any disclaimer, the term of this patent is extended or adjusted under 35 U.S.C. 154(b) by 0 days.

(21) Appl. No.: 14/909,719

(22) PCT Filed: Aug. 1, 2014

(86) PCT No.: PCT/US2014/049343
§ 371 (c)(1),
(2) Date: Feb. 2, 2016

(87) PCT Pub. No.: WO2015/017750
PCT Pub. Date: Feb. 5, 2015

(65) Prior Publication Data
US 2016/0186048 A1 Jun. 30, 2016

Related U.S. Application Data

(60) Provisional application No. 61/861,815, filed on Aug. 2, 2013.

(51) Int. Cl.
*C09K 8/80* (2006.01)
*C04B 33/04* (2006.01)

(52) U.S. Cl.
CPC .............. *C09K 8/80* (2013.01); *C04B 33/04* (2013.01); *C04B 2235/3201* (2013.01);
(Continued)

(58) Field of Classification Search
None
See application file for complete search history.

(56) References Cited

U.S. PATENT DOCUMENTS 5,128,606 A    7/1992  Gate et al.
5,576,617 A    11/1996 Webb et al.
(Continued)

FOREIGN PATENT DOCUMENTS

EP    0 528 078 A1    2/1993
EP    0 631 665 A1    1/1995
(Continued)

OTHER PUBLICATIONS

International Search Report and Written Opinion dated Oct. 22, 2014, in PCT International Application No. PCT/US2014/049343, filed Aug. 1, 2014.

*Primary Examiner* — Jeffrey Washville
(74) *Attorney, Agent, or Firm* — Finnegan, Henderson, Farabow, Garrett & Dunner, LLP

(57) ABSTRACT

A method of making a sintered ceramic proppant may include providing a kaolin clay. The kaolin clay may include an $Al_2O_3$ content no greater than about 46% by weight, and a $K_2O$ content no greater than 0.1% by weight. The kaolin clay may have a particle size distribution such that greater than 70% of the particles have an equivalent spherical diameter of less than 0.5 microns as measured by Sedigraph, and a shape factor less than about 18. The method may further include blunging the kaolin clay, agglomerating the kaolin clay, and sintering the agglomerated kaolin clay to produce a sintered ceramic proppant. The kaolin clay may have an A-bob Hercules viscosity of at least about 3,300 rpm at 18 kilodyne-cm and 70% solids.

21 Claims, 1 Drawing Sheet

(52) U.S. Cl.
CPC ............... *C04B 2235/5296* (2013.01); *C04B 2235/5409* (2013.01); *C04B 2235/5445* (2013.01); *C04B 2235/5463* (2013.01); *C04B 2235/6562* (2013.01); *C04B 2235/6565* (2013.01); *C04B 2235/77* (2013.01); *C04B 2235/96* (2013.01)

(56) References Cited

U.S. PATENT DOCUMENTS

| | | | |
|---|---|---|---|
| 6,514,333 | B1 | 2/2003 | Yuan et al. |
| 6,564,199 | B1 | 5/2003 | Pruett et al. |
| 8,063,000 | B2 | 11/2011 | Wilson |
| 8,465,583 | B2 * | 6/2013 | Pruett ............... C04B 33/04 106/486 |
| 2006/0124033 | A1 | 6/2006 | Pruett et al. |
| 2010/0113251 | A1 | 5/2010 | San-Miguel et al. |
| 2013/0022816 | A1 * | 1/2013 | Smith ............... C04B 18/082 428/404 |
| 2013/0028042 | A1 | 1/2013 | Pruett et al. |

FOREIGN PATENT DOCUMENTS

| | | |
|---|---|---|
| GB | 2 240 398 A | 7/1991 |
| WO | WO 94/16308 | 7/1994 |
| WO | WO 2015/017750 A1 | 2/2015 |

* cited by examiner

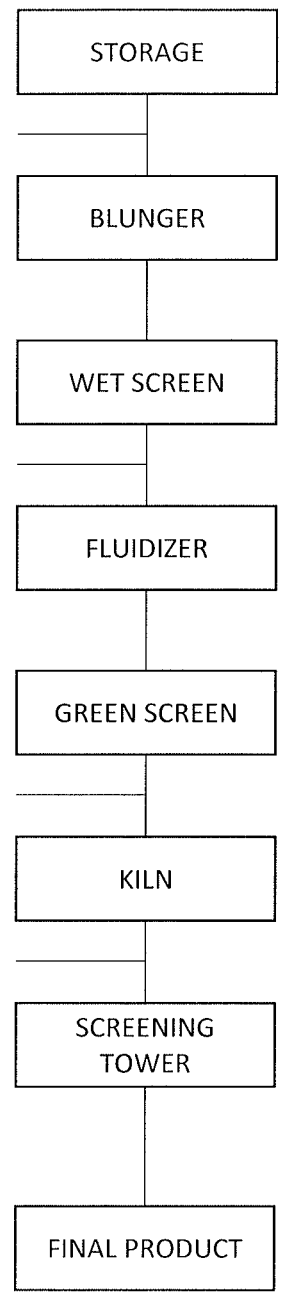

PROPPANTS AND ANTI-FLOWBACK ADDITIVES INCLUDING KAOLIN CLAY

CLAIM OF PRIORITY

This application is a U.S. national stage entry under 35 U.S.C. §371 from PCT International Application No. PCT/US2014/049343, filed Aug. 1, 2014, which claims priority to and the benefit of the filing date of U.S. Provisional Application No. 61/861,815, filed Aug. 2, 2013, to both of which this application claims the benefit of priority, and the entirety of the subject matter of both of which is incorporated herein by reference to its entirety.

FIELD OF THE DISCLOSURE

The present disclosure relates to proppants and anti-flowback additives including kaolin clay for use in fracturing operations, and more particularly, to sintered ceramic proppants including kaolin clay and methods for making sintered ceramic proppants including kaolin clay.

BACKGROUND OF THE DISCLOSURE

Naturally occurring deposits containing oil and natural gas are located throughout the world. Given the porous and permeable nature of the subterranean structure, it is possible to bore into the earth and set up a well where oil and natural gas are pumped out of the deposit. These wells are large, costly structures that are typically fixed at one location. As is often the case, a well may initially be very productive, with the oil and natural gas being pumpable with relative ease. As the oil or natural gas near the well bore is removed from the deposit, other oil and natural gas may flow to the area near the well bore so that it may be pumped as well. However, as a well ages, and sometimes merely as a consequence of the subterranean geology surrounding the well bore, the more remote oil and natural gas may have difficulty flowing to the well bore, thereby reducing the productivity of the well.

To address this problem and to increase the flow of oil and natural gas to the well bore, a technique may be employed of fracturing the subterranean area around the well to create more paths for the oil and natural gas to flow toward the well bore. This fracturing may be performed by hydraulically injecting a fracturing fluid at high pressure into the area surrounding the well bore. This fracturing fluid is thereafter removed from the fracture to the extent possible so that it does not impede the flow of oil or natural gas back to the well bore. Once the fracturing fluid is removed, however, the fractures may tend to collapse due to the high compaction pressures experienced at well-depths, which may exceed 20,000 feet.

To reduce the likelihood of the fractures closing, a propping agent, also known as a "proppant" or "anti-flowback additive," may be included in the fracturing fluid, so that as much of the fracturing fluid as possible may be removed from the fractures while leaving the proppant behind to hold the fractures open. As used in this application, the term "proppant" refers to any non-liquid material that is present in a proppant pack (a plurality of proppant particles) and provides structural support in a propped fracture. "Anti-flowback additive" refers to any material that is present in a proppant pack and reduces the flowback of proppant particles but still allows for production of oil at desired rates. The terms "proppant" and "anti-flowback additive" are not necessarily mutually exclusive, so a single particle type may meet both definitions. For example, a proppant particle may provide structural support in a fracture, and it may also be shaped to have anti-flowback properties, allowing it to meet both definitions.

Because there may be extremely high closing pressures in fractures, it may be desirable to provide proppants and anti-flowback additives that have a high crush resistance. For example, the useful life of the well may be shortened if the proppant particles break down, allowing the fractures to collapse and/or clog with "fines" created by the broken-down proppant particles. For this reason, it may be desirable to provide proppants that are resistant to breakage, even under high crush pressures.

In addition, it may also be desirable to provide a proppant or anti-flowback additive that packs well with other proppant particles and the surrounding geological features, so that the nature of this packing of particles does not unduly impede the flow of the oil and natural gas through the fractures. For example, if the proppant particles become too tightly packed and create low porosity, they may actually inhibit the flow of the oil or natural gas to the well bore rather than increase it.

The nature of the packing may also affect the overall turbulence generated as the oil or natural gas flows through the fractures. Too much turbulence may increase the flow-back of the proppant particles from the fractures toward the well bore, which may undesirably decrease the flow of oil and natural gas, contaminate the well, cause abrasion to the equipment in the well, and/or increase the production cost as the proppants that flow back toward the well must be removed from the oil and natural gas. In addition, too much turbulence may also increase a non-Darcy flow effect, which may ultimately result in decreased conductivity.

As resources become more scarce, the search for oil and natural gas may involve penetration into deeper geological formations, and the recovery of the such resources may become increasingly difficult. Therefore, there may be a desire to provide proppants and anti-flowback additives that have an excellent conductivity and permeability under extreme conditions. In addition, there may be a desire to provide proppants and anti-flowback additives formed from less costly or more prevalent materials that still provide one or more desirable characteristics for propping fractures in modern wells.

SUMMARY

According to one aspect, a method of making a sintered ceramic proppant may include providing a kaolin clay. The kaolin clay may include an $Al_2O_3$ content no greater than about 46% by weight, and a $K_2O$ content no greater than 0.1% by weight. The kaolin clay may have a particle size distribution of particles of the kaolin clay such that greater than 70% of the particles have an equivalent spherical diameter of less than 0.5 microns as measured by Sedigraph, and a shape factor less than about 18. The method may further include blunging the kaolin clay, agglomerating the kaolin clay, and sintering the agglomerated kaolin clay to produce a sintered ceramic proppant.

As will be appreciated by those skilled in the art, the particle size distribution of a particulate material such as the kaolin clay may be determined by measuring the sedimentation speeds of the dispersed particles of the particulate material under test through a standard dilute aqueous suspension using a SEDIGRAPH® instrument (e.g., SEDIGRAPH 5100® obtained from Micromeritics Corporation, USA). The size of a given particle may be expressed in terms of the diameter of a sphere of equivalent diameter (i.e., the "equivalent spherical diameter" or esd), which sediments through the suspension, which may be used to characterize the particulate material. The SEDIGRAPH records the percentage by weight of particles having an esd less than a particular esd value, versus that esd value.

A kaolin product of relatively high shape factor may be considered to be more "platey" than a kaolin product of low shape factor, which may be considered to be more "blocky." "Shape factor" as used herein is a measure of an average value (on a weight average basis) of the ratio of mean particle diameter to particle thickness for a population of particles of varying size and shape, as measured using the electrical conductivity method and apparatus described in GB No. 2,240,398, U.S. Pat. No. 5,128,606, EP No. 0 528 078, U.S. Pat. No. 5,576,617, and EP 631 665, and using the equations derived in these publications. For example, in the measurement method described in EP No. 0 528 078, the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and by using the difference between the two conductivity measurements, the shape factor of the particulate material under test is determined. "Mean particle diameter" is defined as the diameter of a circle, which has the same area as the largest face of the particle.

According to a further aspect, the kaolin clay may have an $Al_2O_3$ content ranging from about 42% by weight to about 46% by weight, for example, an $Al_2O_3$ content ranging from about 43% by weight to about 45% by weight.

According to still another aspect, the kaolin clay may include a blend of a first kaolin clay including less than about 0.1% by weight $K_2O$ and a second kaolin clay including greater than about 0.1% by weight $K_2O$. The blend may include at least about 10% by weight of the first kaolin clay, for example, at least about 25% by weight of the first kaolin clay.

According to still another aspect, the kaolin clay may include a blend of a first kaolin clay including not greater than about 46% by weight $Al_2O_3$ and a second kaolin clay including greater than about 47% by weight $Al_2O_3$. For example, the second kaolin clay may have an $Al_2O_3$ content ranging from about 49% to about 55% by weight, or from about 50% to about 53% by weight. The blend may include at least about 10% by weight of the first kaolin clay, for example, at least about 25% by weight of the first kaolin clay.

According to a further aspect, the particle size distribution of the kaolin clay may be such that greater than 75% of the particles have an equivalent spherical diameter of less than 0.5 microns as measured by Sedigraph, such as, for example, greater than about 77%, or even greater than about 81%. For example, the particle size distribution of the kaolin clay may be such that about 70% to about 85% of the particles have an equivalent spherical diameter of less than 0.5 microns as measured by Sedigraph, such as, for example, from about 75% to about 82%.

According to a further aspect, the particle size distribution of the kaolin clay may be such that greater than 90% of the particles have an equivalent spherical diameter of less than 2 microns as measured by Sedigraph, such as, for example, greater than about 93%, greater than about 94%, greater than about 95%, or even greater than about 96%. For example, the particle size distribution of the kaolin clay may be such that greater than about 85% of the particles have an equivalent spherical diameter of less than 1 micron as measured by Sedigraph, such as, for example, greater than about 87%, greater than about 89%, greater than about 90%, or even greater than about 92%. For example, the particle size distribution of the kaolin clay may be such that greater than about 40% of the particles have an equivalent spherical diameter of less than 0.25 microns as measured by Sedigraph, such as, for example, greater than about 45%, greater than about 50%, or even greater than about 55%.

According to a further aspect, the kaolin clay may include a $K_2O$ content ranging from about 0.005% by weight to about 0.08% by weight. For example, the kaolin clay may include a $K_2O$ content ranging from about 0.01% by weight to about 0.06% by weight.

According to still another aspect, the shape factor may be less than about 15, or less than about 10. For example, the shape factor may range from about 2 to about 15, from about 2 to about 10, or from about 5 to about 8.

According to yet another aspect, the kaolin clay particles may have a BET surface area of greater than about 15 $m^2/g$. For example, the kaolin clay particles may have a BET surface area of greater than about 20 $m^2/g$, or greater than about 35 $m^2/g$. According to another aspect, the kaolin clay particles may have a BET surface area ranging from about 15 $m^2/g$ to about 35 $m^2/g$.

According to another aspect, the sintered ceramic proppant may have a specific gravity greater than about 2.65, a specific gravity greater than about 2.68, for example, a specific gravity greater than about 2.7.

According to still a further aspect, the sintered ceramic proppant may have a bulk density greater than about 1.44 $g/cm^3$. For example, the sintered ceramic proppant may have a bulk density greater than about 1.45 $g/cm^3$, greater than about 1.46 $g/cm^3$, greater than about 1.47 $g/cm^3$, or greater than about 1.48 $g/cm^3$. For example, the sintered ceramic proppant may have a bulk density ranging from about 1.45 $g/cm^3$ to about 1.50 $g/cm^3$. According to yet another aspect, the crush strength measured under ISO 13503-2 of the sintered ceramic proppant at 10,000 psi may be less than about 6% fines by weight, for example, for a 30/50 mesh size proppant. For example, the crush strength measured under ISO 13503-2 of the sintered ceramic proppant at 10,000 psi may be less than about 5% fines by weight, or less than about 4% fines by weight.

The strength of a proppant may be indicated from a proppant crush resistance test described in ISO 13503-2: "Measurement of Properties of Proppants Used in Hydraulic Fracturing and Gravel-packing Operations." In this test, a sample of proppant is first sieved to remove any fines (i.e., undersized pellets or fragments that may be present), then placed in a crush cell where a piston is then used to apply a confined closure stress of some magnitude above the failure point of some fraction of the proppant pellets. The sample is then re-sieved and the weight percent of fines generated as a result of pellet failure is reported as percent crush. A comparison of the percent crush of two equally sized samples is a method of gauging the relative strength of the two samples.

Permeability is part of the proportionality constant in Darcy's Law, which relates flow rate and fluid physical properties (e.g., viscosity) to the stress level applied to a proppant pack. Permeability is a property specifically relating to a proppant pack, not the fluid. Conductivity, on the other hand, describes the ease with which fluid moves through pore spaces in a proppant pack. Conductivity depends on the intrinsic permeability of a proppant pack as well as the degree of saturation. In particular, conductivity expresses the amount of water that will flow through a cross-sectional area of a proppant pack under the desired stress level.

According to a further aspect, wherein the kaolin clay may have an A-bob Hercules viscosity of at least about 3,300 rpm at 18 kilodyne-cm and 70% solids. For example, the kaolin clay may have an A-bob Hercules viscosity of at least about 3,700 rpm at 18 kilodyne-cm and 70% solids, at least about 4,000 rpm at 18 kilodyne-cm and 70% solids, or at least about 4,400 rpm at 18 kilodyne-cm and 70% solids, or less than 18 kilodyne-cm at 4,400 rpm measured at 70% solids.

Hercules viscometers provide a measure of a kaolin clay slurry's high shear viscosity. Hercules viscosity is measured by placing a cylinder (i.e., a bob) of appropriate diameter and length (e.g., the A-bob) into a sample cup containing clay slurry. Hercules viscosities of various samples can be compared by holding constant the percent solids concentration of the sample, the bob size, and the applied force. The Hercules viscometer applies a force to the bob, which causes it to spin at a controlled accelerating rate. As the viscometer increases the bob spin rate, the viscous drag on the cup increases. Clay slurries with poor high shear rheology will exert the maximum measurable force on the cup at a lower bob rpm than clay slurries with "good" high shear rheology. Hercules viscosity is therefore typically expressed in terms of bob spin rates, for example, in revolutions per minute (rpm). A "dyne endpoint" is an indication of a very low Hercules viscosity. A dyne endpoint is reached when the bob reaches its maximum rpm before the maximum measurable force is exerted on the cup. For more fluid slurries, the Hercules viscosity is reported as a function of the force in kilodyne-cm required to spin the bob at its maximum speed of 4,400 rpm.

According to yet another aspect, a method of making a sintered ceramic proppant may include providing a kaolin clay. The kaolin clay may include an $Al_2O_3$ content no greater than about 46% by weight, and a $K_2O$ content no greater than 0.1% by weight. The kaolin clay may have a particle size distribution of particles of the kaolin clay such that greater than 70% of the particles have an equivalent spherical diameter of less than 0.5 microns as measured by Sedigraph, and an A-bob Hercules viscosity of at least about 3,300 rpm at 18 kilodyne-cm and 70% solids. The method may further include blunging the kaolin clay, agglomerating the kaolin clay, and sintering the agglomerated kaolin clay to produce a sintered ceramic proppant. According to another aspect, the kaolin clay may have a shape factor less than about 18. For example, the kaolin clay may have a shape factor less than about 15, less than about 10, for example, a shape factor ranging from about 2 to about 10, or from about 5 to about 8.

It is to be understood that both the foregoing general description and the following detailed description are exemplary and explanatory only and are not restrictive of the invention.

BRIEF DESCRIPTION OF THE DRAWING

FIG. 1 is a schematic diagram of an exemplary process for making exemplary sintered ceramic proppants consistent with exemplary methods disclosed herein.

DESCRIPTION OF EXEMPLARY EMBODIMENTS

Reference will now be made to exemplary embodiments. Applicant has surprisingly found that relatively fine kaolin clay having a relatively low shape factor may be used as a feed material for producing proppants and anti-flowback additives that may exhibit one or more desirable proppant properties, such as, for example, relatively high crush resistance, relatively high conductivity, relatively high permeability, a desirable bulk density, and/or a desirable specific gravity. This fine, blocky kaolin clay may be used as a feed material that is processed, including sintering, to form a sintered ceramic proppant.

For example, according to some embodiments, a method of making a sintered ceramic proppant may include providing a kaolin clay, wherein the kaolin clay may include an $Al_2O_3$ content no greater than about 46% by weight, and a $K_2O$ content no greater than 0.1% by weight. The kaolin clay may have a particle size distribution such that greater than 70% of the particles have an equivalent spherical diameter of less than 0.5 microns as measured by Sedigraph, and a shape factor less than about 18. The method may further include blunging the kaolin clay, agglomerating the kaolin clay, and sintering the agglomerated kaolin clay to produce a sintered ceramic proppant.

According to some embodiments, the kaolin clay may have an $Al_2O_3$ content ranging from about 42% by weight to about 46% by weight, for example, an $Al_2O_3$ content ranging from about 43% by weight to about 45% by weight.

According to some embodiments, the kaolin clay may include a blend of a first kaolin clay including less than about 0.1% by weight $K_2O$ and a second kaolin clay including greater than about 0.1% by weight $K_2O$. The blend may include at least about 10% by weight of the first kaolin clay, for example, at least about 25% by weight of the first kaolin clay.

According to some embodiments, the kaolin clay may include a blend of a first kaolin clay including not greater than about 46% by weight $Al_2O_3$ and a second kaolin clay including greater than about 47% by weight $Al_2O_3$. For example, the second kaolin clay may have an $Al_2O_3$ content ranging from about 49% to about 55% by weight, or from about 50% to about 53% by weight. The blend may include at least about 10% by weight of the first kaolin clay, for example, at least about 25% by weight of the first kaolin clay.

According to some embodiments, the particle size distribution of the kaolin clay may be such that greater than 75% of the particles have an equivalent spherical diameter of less than 0.5 microns as measured by Sedigraph, such as, for example, greater than about 77%, or even greater than about 81%. For example, the particle size distribution of the kaolin clay may be such that about 70% to about 85% of the particles have an equivalent spherical diameter of less than 0.5 microns as measured by Sedigraph, such as, for example, from about 75% to about 82%.

According to some embodiments, the particle size distribution of the kaolin clay may be such that greater than about 90% of the particles have an equivalent spherical diameter of less than 2 microns as measured by Sedigraph, such as, for example, greater than about 93%, greater than about 94%, greater than about 95%, or even greater than about 96%. For example, the particle size distribution of the kaolin clay may be such that greater than about 85% of the particles have an equivalent spherical diameter of less than 1 micron as measured by Sedigraph, such as, for example, greater than about 87%, greater than about 89%, greater than about 90%, or even greater than about 92%. For example, the particle size distribution of the kaolin clay may be such that greater than about 40% of the particles have an equivalent spherical diameter of less than 0.25 microns as measured by Sedigraph, such as, for example, greater than about 45%, greater than about 50%, or even greater than about 55%.

According to some embodiments, the kaolin clay may include a K₂O content ranging from about 0.005% by weight to about 0.08% by weight. For example, the kaolin clay may include a K₂O content ranging from about 0.01% by weight to about 0.06% by weight. Although not wishing to be bound by theory, it is believed that K₂O provides an indicator of the presence of mica in the kaolin clay. Mica is generally associated with a high shape factor, which leads to a high viscosity of a kaolin clay slurry.

According to some embodiments, the kaolin clay may have a shape factor less than about 15, or less than about 10. For example, the shape factor may range from about 2 to about 15, from about 2 to about 10, or from about 5 to about 8.

According to some embodiments, the kaolin clay particles may have a BET surface area of greater than about 15 m²/g. For example, the kaolin clay particles may have a BET surface area of greater than about 20 m²/g, or greater than about 35 m²/g. According to another aspect, the kaolin clay particles may have a BET surface area ranging from about 15 m²/g to about 35 m²/g.

According to some embodiments, the sintered ceramic proppant may have a specific gravity greater than about 2.65, or a specific gravity greater than about 2.68. For example, the specific gravity may be greater than about 2.7.

According to some embodiments, the sintered ceramic proppant may have a bulk density greater than about 1.44 g/cm³. For example, the sintered ceramic proppant may have a bulk density greater than about 1.45 g/cm³, greater than about 1.46 g/cm³, greater than about 1.47 g/cm³, or greater than about 1.48 g/cm³. For example, the sintered ceramic proppant may have a bulk density ranging from about 1.45 g/cm³ to about 1.50 g/cm³.

According to some embodiments, the crush strength measured under ISO 13503-2 of a 30/50 mesh sintered ceramic proppant at 10,000 psi may be less than about 6% fines by weight. For example, the crush strength measured under ISO 13503-2 of a 30/50 mesh sintered ceramic proppant at 10,000 psi may be less than about 5% fines by weight, or less than about 4% fines by weight.

According to some embodiments, the kaolin clay may have an A-bob Hercules viscosity of at least about 3,300 rpm at 18 kilodyne-cm and 70% solids. For example, the kaolin clay may have an A-bob Hercules viscosity of at least about 3,700 rpm at 18 kilodyne-cm and 70% solids, at least about 4,000 rpm at 18 kilodyne-cm and 70% solids, or at least about 4,400 rpm at 18 kilodyne-cm and 70% solids.

According to some embodiments, a method of making a sintered ceramic proppant may include providing a kaolin clay, wherein the kaolin clay may include an Al₂O₃ content no greater than about 46% by weight, and a K₂O content no greater than 0.1% by weight. The kaolin clay may have a particle size distribution of particles of the kaolin clay such that greater than 70% of the particles have an equivalent spherical diameter of less than 0.5 microns as measured by Sedigraph, and an "A-bob" Hercules viscosity of at least about 3,300 rpm at 18 kilodyne-cm and 70% solids. The method may further include blunging the kaolin clay, agglomerating the kaolin clay, and sintering the agglomerated kaolin clay to produce a sintered ceramic proppant. According to some embodiments, the kaolin clay may have a shape factor less than about 18. For example, the kaolin clay may have a shape factor less than about 15, less than about 10, for example, a shape factor ranging from about 2 to about 10, or from about 5 to about 8.

FIG. 1 is a schematic diagram of an exemplary process for making sintered ceramic proppants consistent with exemplary methods disclosed herein. As shown in FIG. 1, a kaolin clay, for example, a fine, blocky feed kaolin clay, is transferred from storage to a blunger for blunging in a conventional manner known to those skilled in the art with inorganic or organic dispersant (e.g., TSPP, SHMP, Na-polyacrylate, and/or similar dispersants). Thereafter, the blunged feed kaolin clay is wet-screened and degritted, after which the degritted feed kaolin clay is fluidized for agglomeration. According to some embodiments, agglomeration may be performed using a spray fluidizer such as, for example, a fluidizer marketed by NIRO. Following agglomeration, the feed kaolin clay is green-screened, and undersized material is recirculated to the fluidizer to serve as seeds. According to some embodiments, 35 mesh screen may be used. Thereafter, the feed kaolin clay may be sintered in a kiln. For example, the feed may be heated in a kiln with the temperature being increased at a rate of, for example, 10° C. per minute until it reaches a temperature of, for example, 1,450° C. According to some embodiments, this temperature may be maintained for, for example, about an hour, and thereafter, the temperature may be reduced at a rate of, for example, about 5° C. per minute. Thereafter, the sintered and cooled material may be fed to a screening tower to classify the sintered material into different grades (e.g., oversized, undersized, and dust). Thereafter, the final sintered ceramic proppant may be obtained.

EXAMPLES

The following examples include five samples: three samples and two comparative samples of feed kaolin clays used to form sintered ceramic proppants of the five proppant samples tested. Table 1 below shows the chemical content in weight percent of the five feed kaolin clay samples.

TABLE 1

| Sample | Total (%) | Fired Basis | | | | | | | | Total Alkali (%) |
| | | Fe2O3 (%) | MgO (%) | Al2O3 (%) | SiO2 (%) | TiO2 (%) | CaO (%) | Na2O (%) | K2O (%) | |
| --- | --- | --- | --- | --- | --- | --- | --- | --- | --- | --- |
| Sample 1 | 100.5 | 1.11 | 0.07 | 44.52 | 52.14 | 2.53 | 0.05 | 0.01 | 0.03 | 0.16 |
| Sample 2 | 100.5 | 1.08 | 0.05 | 43.80 | 51.84 | 3.59 | 0.06 | 0.00 | 0.05 | 0.16 |
| Sample 3 | 100.6 | 1.57 | 0.07 | 43.88 | 52.68 | 2.14 | 0.06 | 0.07 | 0.09 | 0.29 |
| Comparative Sample 1 | 100.2 | 1.53 | 0.08 | 43.77 | 52.40 | 2.02 | 0.09 | 0.01 | 0.17 | 0.36 |
| Comparative Sample 2 | 101.1 | 0.44 | 0.06 | 52.16 | 46.43 | 2.01 | 0.04 | 0.00 | 0.09 | 0.19 |

Table 2 below shows material characteristics of the five feed kaolin clay samples listed in the same order as Table 1. Note that for Samples 1 and 2, the Hercules viscosity is shown in units of kilodyne-cm @ 4,400 rpm rather than rpm because for more fluid slurries, the Hercules viscosity is reported as a function of the force in kilodyne-cm required to spin the bob at its maximum speed of 4,400 rpm.

TABLE 2

| Shape Factor (NSF) | 2 um | 1 um | 0.5 um | 0.25 um | Solids(%) | w/SHMP Poly (#/t) | Hercules rpm | pH | BET SA $m^2/g$ |
|---|---|---|---|---|---|---|---|---|---|
| 6 | 94.5 | 91.4 | 83.0 | 59.6 | 70 | — | 6.1 | 6.9 | 24.0 |
| 8 | 92.6 | 88.6 | 79.0 | 53.0 | 70 | — | 5.4 | 6.9 | |
| 11.3 | 92.9 | 88.3 | 78.2 | 57.5 | 70 | 17 | 3718 | 6.7 | |
| 18 | 94.8 | 90.5 | 81.0 | 58.4 | 69.7 | 11 | 2384 | | 25.6 |
| 5 | 61.3 | 45.3 | 27.5 | 15.7 | 70 | 8 | 770 | 7.2 | |

Table 3 below shows the corresponding fired real density, fired bulk density, and crush resistance at 10,000 psi according ISO 13503-2 of five 30/50 mesh proppant samples prepared according to methods consistent with the exemplary methods disclosed previously herein, as follows: Samples 1-3 correspond to the feed kaolin clay Samples 1-3 shown in Tables 1 and 2; Comparative Sample 1 corresponds to Comparative Sample 1 of the feed kaolin clay; and the remaining sample is a blend of the feed kaolin clays of 50% by weight of Sample 3, 40% by weight of Comparative Sample 1, and 10% of a high-alumina content kaolin clay. All the proppant samples tested were screened to 325 mesh using 035 mesh plant seed. The proppant samples were obtained by being passed through a 30 mesh but retained on 50 mesh (i.e., "30/50").

TABLE 3

| Feed Sample | Fired real density (g/cc) | Fired Bulk density (g/cc) | 10K Crush 30/50 |
|---|---|---|---|
| Sample 1 | 2.69 | 1.49 | 3.6 |
| Sample 2 | 2.66 | 1.49 | 3.3 |
| Sample 3 | 2.66 | 1.46 | 5.8 |
| Comparative Sample 1 | 2.57 | 1.42 | 7.3 |
| 50% Sample 3/40% Comparative Sample 1/10% High Alumina Kaolin | 2.65 | 1.47 | 4 |

As shown in Table 3, the sintered ceramic proppant Samples 1-3 exhibit a better crush resistance (i.e., a lower percentage of fines) than Comparative Sample 1. In addition, the blended Sample also exhibits a better crush resistance than Comparative Sample 1, but an inferior crush resistance relative to Samples 1 and 2.

For the avoidance of doubt, the present application is directed to the subject matter described in the following numbered options (i.e., numbered options 1-62).

Option 1. A method of making a sintered ceramic proppant, the method comprising: providing a kaolin clay comprising an $Al_2O_3$ content of not greater than about 46% by weight, and a $K_2O$ content no greater than 0.1% by weight, and having a particle size distribution of particles of the kaolin clay such that greater than 70% of the particles have an equivalent spherical diameter of less than 0.5 microns as measured by Sedigraph, and a shape factor less than about 18; blunging the kaolin clay; agglomerating the kaolin clay; and sintering the agglomerated kaolin clay to produce a sintered ceramic proppant.

Option 2. The method according to numbered option 1, wherein the kaolin clay has an $Al_2O_3$ content ranging from about 42% by weight to about 46% by weight.

Option 3. The method according to any preceding numbered option (i.e., options 1 and 2), wherein the kaolin clay has an $Al_2O_3$ content ranging from about 43% by weight to about 45% by weight.

Option 4. The method according to any preceding numbered option, wherein the kaolin clay comprises a blend of a first kaolin clay comprising less than about 0.1% by weight $K_2O$ and a second kaolin clay comprising greater than about 0.1% by weight $K_2O$, wherein the blend comprises at least about 10% by weight of the first kaolin clay.

Option 5. The method according to any preceding numbered option, wherein the blend comprises at least about 25% by weight of the first kaolin clay.

Option 6. The method according to any preceding numbered option, wherein the particle size distribution of the kaolin clay is such that greater than 93% of the particles have an equivalent spherical diameter of less than 2 microns as measured by Sedigraph.

Option 7. The method according to any preceding numbered option, wherein the particle size distribution of the kaolin clay is such that greater than 85% of the particles have an equivalent spherical diameter of less than 1 micron as measured by Sedigraph.

Option 8. The method according to any preceding numbered option, wherein the particle size distribution of the kaolin clay is such that greater than 40% of the particles have an equivalent spherical diameter of less than 0.25 microns as measured by Sedigraph.

Option 9. The method of according to any preceding numbered option, wherein the kaolin clay comprises a $K_2O$ content ranging from about 0.005% by weight to about 0.08% by weight.

Option 10. The method according to any preceding numbered option, wherein the kaolin clay comprises a $K_2O$ content ranging from about 0.01% by weight to about 0.06% by weight.

Option 11. The method according to any preceding numbered option, wherein the shape factor is less than about 15.

Option 12. The method according to any preceding numbered option, wherein the shape factor is less than about 10.

Option 13. The method according to any preceding numbered option, wherein the shape factor ranges from about 2 to about 15.

Option 14. The method according to any preceding numbered option, wherein the shape factor ranges from about 5 to about 8.

Option 15. The method according to any preceding numbered option, wherein the kaolin clay particles have a BET surface area of greater than about 15 $m^2/g$.

Option 16. The method according to any preceding numbered option, wherein the kaolin clay particles have a BET surface area of greater than about 20 $m^2/g$.

Option 17. The method according to any preceding numbered option, wherein the kaolin clay particles have a BET surface area of greater than about 35 m$^2$/g.

Option 18. The method according to any preceding numbered option, wherein the kaolin clay particles have a BET surface area ranging from about 15 m$^2$/g to about 35 m$^2$/g.

Option 19. The method according to any preceding numbered option, wherein the sintered ceramic proppant has a specific gravity greater than about 2.65.

Option 20. The method according to any preceding numbered option, wherein the sintered ceramic proppant has a specific gravity greater than about 2.68.

Option 21. The method according to any preceding numbered option, wherein the sintered ceramic proppant has a specific gravity greater than about 2.7.

Option 22. The method according to any preceding numbered option, wherein the sintered ceramic proppant has a bulk density greater than about 1.44 g/cm$^3$.

Option 23. The method according to any preceding numbered option, wherein the sintered ceramic proppant has a bulk density greater than about 1.45 g/cm$^3$.

Option 24. The method according to any preceding numbered option, wherein the sintered ceramic proppant has a bulk density ranging from about 1.45 g/cm$^3$ to about 1.50 g/cm$^3$.

Option 25. The method according to any preceding numbered option, wherein the crush strength measured under ISO 13503-2 of the sintered ceramic proppant at 10,000 psi is less than about 6% fines by weight.

Option 26. The method according to any preceding numbered option, wherein the crush strength measured under ISO 13503-2 of the sintered ceramic proppant at 10,000 psi is less than about 5% fines by weight.

Option 27. The method according to any preceding numbered option, wherein the crush strength measured under ISO 13503-2 of the sintered ceramic proppant at 10,000 psi is less than about 4% fines by weight.

Option 28. The method according to any preceding numbered option, wherein the kaolin clay has an A-bob Hercules viscosity of at least about 3,300 rpm at 18 kilodyne-cm and 70% solids.

Option 29. The method according to any preceding numbered option, wherein the kaolin clay has an A-bob Hercules viscosity of at least about 3,700 rpm at 18 kilodyne-cm and 70% solids.

Option 30. The method according to any preceding numbered option, wherein the kaolin clay has an A-bob Hercules viscosity of at least about 4,000 rpm at 18 kilodyne-cm and 70% solids.

Option 31. The method according to any preceding numbered option, wherein the kaolin clay has an A-bob Hercules viscosity of at least about 4,400 rpm at 18 kilodyne-cm and 70% solids.

Option 32. A method of making a sintered ceramic proppant, the method comprising: providing a kaolin clay comprising an Al$_2$O$_3$ content not greater than about 46% by weight, and a K$_2$O content no greater than 0.1% by weight, and having a particle size distribution of particles of the kaolin clay such that greater than 70% of the particles have an equivalent spherical diameter of less than 0.5 microns as measured by Sedigraph, and an A-bob Hercules viscosity of at least about 3,300 rpm at 18 kilodyne-cm and 70% solids; blunging the kaolin clay; agglomerating the kaolin clay; and sintering the agglomerated kaolin clay to produce a sintered ceramic proppant.

Option 33. The method according to any preceding numbered option, wherein the kaolin clay has an A-bob Hercules viscosity of at least about 3,700 rpm at 18 kilodyne-cm and 70% solids.

Option 34. The method according to any preceding numbered option, wherein the kaolin clay has an A-bob Hercules viscosity of at least about 4,000 rpm at 18 kilodyne-cm and 70% solids.

Option 35. The method according to any preceding numbered option, wherein the kaolin clay has an A-bob Hercules viscosity of at least about 4,400 rpm at 18 kilodyne-cm and 70% solids.

Option 36. The method according to any preceding numbered option, wherein the kaolin clay has an Al$_2$O$_3$ content ranging from about 42% by weight to about 46% by weight.

Option 37. The method according to any preceding numbered option, wherein the kaolin clay has an Al$_2$O$_3$ content ranging from about 43% by weight to about 45% by weight.

Option 38. The method according to any preceding numbered option, wherein the kaolin clay comprises a blend of a first kaolin clay comprising less than about 0.1% by weight K$_2$O and a second kaolin clay comprising greater than about 0.1% by weight K$_2$O, wherein the blend comprises at least about 10% by weight of the first kaolin clay.

Option 39. The method according to any preceding numbered option, wherein the blend comprises at least about 25% by weight of the first kaolin clay.

Option 40. The method according to any preceding numbered option, wherein the particle size distribution of the kaolin clay is such that greater than 93% of the particles have an equivalent spherical diameter of less than 2 microns as measured by Sedigraph.

Option 41. The method according to any preceding numbered option, wherein the particle size distribution of the kaolin clay is such that greater than 85% of the particles have an equivalent spherical diameter of less than 1 micron as measured by Sedigraph.

Option 42. The method according to any preceding numbered option, wherein the particle size distribution of the kaolin clay is such that greater than 40% of the particles have an equivalent spherical diameter of less than 0.25 microns as measured by Sedigraph.

Option 43. The method according to any preceding numbered option, wherein the kaolin clay comprises a K$_2$O content ranging from about 0.005% by weight to about 0.08% by weight.

Option 44. The method according to any preceding numbered option, wherein the kaolin clay comprises a K$_2$O content ranging from about 0.01% by weight to about 0.06% by weight.

Option 45. The method according to any preceding numbered option, wherein the kaolin clay has a shape factor less than about 18.

Option 46. The method according to any preceding numbered option, wherein the kaolin clay has a shape factor less than about 15.

Option 47. The method according to any preceding numbered option, wherein the kaolin clay has a shape factor less than about 10.

Option 48. The method according to any preceding numbered option, wherein the kaolin clay has a shape factor ranging from about 2 to about 15.

Option 49. The method according to any preceding numbered option, wherein the kaolin clay has a shape factor ranging from about 5 to about 8.

Option 50. The method according to any preceding numbered option, wherein the kaolin clay particles have a BET surface area of greater than about 15 m²/g.

Option 51. The method according to any preceding numbered option, wherein the kaolin clay particles have a BET surface area of greater than about 20 m²/g.

Option 52. The method according to any preceding numbered option, wherein the kaolin clay particles have a BET surface area of greater than about 35 m²/g.

Option 53. The method according to any preceding numbered option, wherein the kaolin clay particles have a BET surface area ranging from about 15 m²/g to about 35 m²/g.

Option 54. The method according to any preceding numbered option, wherein the sintered ceramic proppant has a specific gravity greater than about 2.65.

Option 55. The method according to any preceding numbered option, wherein the sintered ceramic proppant has a specific gravity greater than about 2.68.

Option 56. The method according to any preceding numbered option, wherein the sintered ceramic proppant has a specific gravity greater than about 2.7.

Option 57. The method according to any preceding numbered option, wherein the sintered ceramic proppant has a bulk density greater than about 1.44 g/cm³.

Option 58. The method according to any preceding numbered option, wherein the sintered ceramic proppant has a bulk density greater than about 1.45 g/cm³.

Option 59. The method according to any preceding numbered option, wherein the sintered ceramic proppant has a bulk density ranging from about 1.45 g/cm³ to about 1.50 g/cm³.

Option 60. The method according to any preceding numbered option, wherein the crush strength measured under ISO 13503-2 of the sintered ceramic proppant at 10,000 psi is less than about 6% fines by weight.

Option 61. The method according to any preceding numbered option, wherein the crush strength measured under ISO 13503-2 of the sintered ceramic proppant at 10,000 psi is less than about 5% fines by weight.

Option 62. The method according to any preceding numbered option, wherein the crush strength measured under ISO 13503-2 of the sintered ceramic proppant at 10,000 psi is less than about 4% fines by weight.

Other embodiments may be apparent to those skilled in the art from consideration of the specification and practice of the exemplary embodiments disclosed herein. It is intended that the specification and examples be considered as exemplary only.

What is claimed is:

1. A method of making a sintered ceramic proppant, the method comprising: providing a kaolin clay comprising an $Al_2O_3$ content of not greater than about 46% by weight, and a $K_2O$ content no greater than 0.1% by weight, and having a particle size distribution of particles of the kaolin clay such that greater than 70% of the particles have an equivalent spherical diameter of less than 0.5 microns as measured by Sedigraph, and a shape factor less than about 18;
blunging the kaolin clay;
agglomerating the kaolin clay; and
sintering the agglomerated kaolin clay to produce a sintered ceramic proppant,
wherein the kaolin clay comprises a blend of a first kaolin clay comprising less than about 0.1% by weight $K_2O$ and a second kaolin clay comprising greater than about 0.1% by weight $K_2O$, and
wherein the blend comprises at least about 10% by weight of the first kaolin clay.

2. The method of claim 1, wherein the kaolin clay has an $Al_2O_3$ content ranging from about 42% by weight to about 46% by weight.

3. The method of claim 2, wherein the kaolin clay has an $Al_2O_3$ content ranging from about 43% by weight to about 45% by weight.

4. The method of claim 1, wherein the blend comprises at least about 25% by weight of the first kaolin clay.

5. The method of claim 1, wherein the particle size distribution of the kaolin clay is such that greater than 93% of the particles have an equivalent spherical diameter of less than 2 microns as measured by Sedigraph.

6. The method of claim 1, wherein the particle size distribution of the kaolin clay is such that greater than 85% of the particles have an equivalent spherical diameter of less than 1 micron as measured by Sedigraph.

7. The method of claim 1, wherein the particle size distribution of the kaolin clay is such that greater than 40% of the particles have an equivalent spherical diameter of less than 0.25 microns as measured by Sedigraph.

8. The method of claim 1, wherein the kaolin clay comprises a $K_2O$ content ranging from about 0.005% by weight to about 0.08% by weight.

9. The method of claim 1, wherein the kaolin clay comprises a $K_2O$ content ranging from about 0.01% by weight to about 0.06% by weight.

10. The method of claim 1, wherein the shape factor is less than about 15.

11. The method of claim 1, wherein the shape factor ranges from about 2 to about 15.

12. The method of claim 1, wherein the shape factor ranges from about 5 to about 8.

13. The method of claim 1, wherein the kaolin clay particles have a BET surface area of greater than about 15 m²/g.

14. The method of claim 1, wherein the kaolin clay particles have a BET surface area of greater than about 35 m²/g.

15. The method of claim 1, wherein the kaolin clay particles have a BET surface area ranging from about 15 m²/g to about 35 m²/g.

16. The method of claim 1, wherein the sintered ceramic proppant has a specific gravity greater than about 2.65.

17. The method of claim 1, wherein the sintered ceramic proppant has a bulk density greater than about 1.44 g/cm³.

18. The method of claim 1, wherein the sintered ceramic proppant has a bulk density ranging from about 1.45 g/cm³ to about 1.50 g/cm³.

19. The method of claim 1, wherein the crush strength measured under ISO 13503-2 of the sintered ceramic proppant at 10,000 psi is less than about 6% fines by weight.

20. The method of claim 1, wherein the kaolin clay has an A-bob Hercules viscosity of at least about 3,300 rpm at 18 kilodyne-cm and 70% solids.

21. A method of making a sintered ceramic proppant, the method comprising:
providing a kaolin clay comprising an $Al_2O_3$ content not greater than about 46% by weight, and a $K_2O$ content no greater than 0.1% by weight, and having a particle size distribution of particles of the kaolin clay such that greater than 70% of the particles have an equivalent spherical diameter of less than 0.5 microns as measured by Sedigraph, and an A-bob Hercules viscosity of at least about 3,300 rpm at 18 kilodyne-cm and 70% solids;

blunging the kaolin clay;
agglomerating the kaolin clay; and
sintering the agglomerated kaolin clay to produce a sintered ceramic proppant,
wherein the kaolin clay comprises a blend of a first kaolin clay comprising less than about 0.1% by weight $K_2O$ and a second kaolin clay comprising greater than about 0.1% by weight $K_7O$, and
wherein the blend comprises at least about 10% by weight of the first kaolin clay.

* * * * *